US009824456B2

(12) United States Patent
Noga et al.

(10) Patent No.: US 9,824,456 B2
(45) Date of Patent: Nov. 21, 2017

(54) AUTOMATIC SEGMENTATION OF IMAGE FRAMES IN ANATOMICAL SCAN BASED ON NON-RIGID REGISTRATION WITH MANUALLY SEGMENTED FRAME

(71) Applicant: The Governors of the University of Alberta, Edmonton (CA)

(72) Inventors: Michelle Noga, Edmonton (CA); Kumaradevan Punithakumar, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 108 days.

(21) Appl. No.: 14/752,105

(22) Filed: Jun. 26, 2015

(65) Prior Publication Data
US 2015/0379724 A1 Dec. 31, 2015

Related U.S. Application Data (60) Provisional application No. 62/017,601, filed on Jun. 26, 2014.

(51) Int. Cl.
*G06K 9/00* (2006.01)
*G06T 7/00* (2017.01)
(Continued)

(52) U.S. Cl.
CPC .......... *G06T 7/0097* (2013.01); *G06K 9/6201* (2013.01); *G06T 3/0068* (2013.01); *G06T 7/0016* (2013.01); *G06T 7/12* (2017.01); *G06T 7/174* (2017.01); *G06T 7/38* (2017.01); *G06T 2207/10088* (2013.01); *G06T 2207/20096* (2013.01); *G06T 2207/30048* (2013.01)

(58) Field of Classification Search
None
See application file for complete search history.

(56) References Cited

U.S. PATENT DOCUMENTS 9,554,729 B2 * 1/2017 Soper .................... A61B 5/066
2004/0260170 A1 * 12/2004 Wood .................... A61B 6/032
600/410

(Continued)

OTHER PUBLICATIONS

K. Punithakumar, M. Noga, P. Boulanger. "A GPU accelerated moving mesh correspondence algorithm with applications to RV segmentation". In: 37th Annual International Conference of the IEEE Engineering in Medicine and Biology Society (EMBC), pp. 4206-4209, Aug. 25-29, 2015.

(Continued)

*Primary Examiner* — Tahmina Ansari
(74) *Attorney, Agent, or Firm* — ATMAC Patent Services Ltd.; Andrew T. MacMillan (57) ABSTRACT

A time series of image frames in an anatomical scan is segmented. An image frame k in the time series of image frames is manually segmented. A non-rigid registration is then performed between the image frame k and a next image frame k+1 in the time series of image frames. A segmentation on the image frame k+1 is computed based on the non-rigid registration. Each subsequent image frame k+n in the time series of image frames is iteratively segmented using non-rigid registration with the segmented previous image frame k+(n−1) in the time series of image frames.

20 Claims, 9 Drawing Sheets

(51) Int. Cl.
  *G06T 3/00* (2006.01)
  *G06K 9/62* (2006.01)
  *G06T 7/38* (2017.01)
  *G06T 7/12* (2017.01)
  *G06T 7/174* (2017.01)

(56) References Cited

U.S. PATENT DOCUMENTS

2009/0060308 A1* 3/2009 Dawant ............... G06T 7/66
                                                  382/131
2011/0081066 A1* 4/2011 Jolly ................ G06T 7/174
                                                  382/131
2015/0379724 A1* 12/2015 Noga ................ G06T 7/0097
                                                  382/128

OTHER PUBLICATIONS

Chen H-m, Goela A, Garvin G J, Li S. "A parameterization of deformation fields for diffeomorphic image registration and its application to myocardial delineation". In: Jiang T, editor. MICCAI 2010, vol. 6361. 2010. p. 340-8.

Liu J, Ph.D. thesis "New development of the deformation method. Department of Mathematics", The University of Texas at Arlington; 2006.

Li B, Young AA, Cowan BR. "GPU accelerated non-rigid registration for the evaluation of cardiac function". In: Metaxas D, editor. Medical Image Computing and Computer-Assisted Intervention (MICCAI), vol. 5242 of Lecture Notes in Computer Science. Berlin, Heidelberg: Springer; 2008. p. 880-7.

Li B, Liu Y, Occleshaw C, Cowan B, Young A. "In-line automated tracking for ventricular function with magnetic resonance imaging". J. Am. Coll. Cardiol.: Cardiovasc. Imaging 2010;3(8):860-6.

Ringenberg J, Deo M, Devabhaktuni V, Berenfeld O, Boyers P, Gold J. "Fast, accurate, and fully automatic segmentation of the right ventricle in short-axis cardiac MRI". Comput. Med. Imaging. Graph. 2014;38(3):190-201.

Punithakumar, Kumaradevan; Noga, Michelle; Boulanger, Pierre; "Cardiac Right Ventricular Segmentation via Point Correspondence", 35th Annual International Conference of the IEEE EMBS, Osaka, Japan, Jul. 3-7, 2013.

Punithakumar, Kumaradevan; Noga, Michelle; Ayed, Ismail Ben; Boulanger, Pierre; "Right ventricular segmentation in cardiac MRI with moving mesh correspondences"; Computerized Medical Imaging and Graphics 43 (2015) 15-25.

* cited by examiner

AUTOMATIC SEGMENTATION OF IMAGE FRAMES IN ANATOMICAL SCAN BASED ON NON-RIGID REGISTRATION WITH MANUALLY SEGMENTED FRAME

CROSS-REFERENCE TO RELATED APPLICATIONS

This application claims the benefit of Provisional Application No. 62/017,601, filed Jun. 26, 2014, entitled "CARDIAC SEGMENTATION WITH POINT CORRESPONDENCE," which is incorporated herein by reference in its entirety.

TECHNICAL FIELD

The present invention relates to anatomical imaging. More specifically, the present invention relates to automatic delineation of the boundaries of an anatomical feature using non-rigid image registration to build point correspondence between a sequence of image frames.A

BACKGROUND

Assessment of right ventricular (RV) function and volume is important in the diagnosis of cardiovascular diseases. Clinical measurements, such as the RV ejection fraction (EF) and volumes, have diagnostic, prognostic, and therapeutic uses in association with various pathologies, such as for determining cardiac function in patients with acquired heart disease.

Magnetic resonance (MR) imaging allows an exhaustive RV evaluation with high spatial resolution, and provides a large number of images. MR imaging has several advantages over other imaging techniques (e.g., echocardiography), including excellent image quality and lack of geometric assumptions. For quantitative functional analysis and to obtain clinical measurements such as EF, it is essential to delineate the RV. Manual delineation of the RV boundary in all MR images is tedious and time-consuming, and recent research has been dedicated to automating the delineation process.

Due to its complex morphology and function, assessment of the RV is acknowledged as a more challenging problem than the assessment of the left ventricle. The problem becomes more difficult due to thin and ill-defined RV borders, its crescent shaped structure, and the complex deformations of the RV chamber. Further, RV segmentation methods should consider the photometric similarities between the connected cardiac regions. For example, the papillary muscles and heart wall have approximately the same luminous intensity. Therefore, standard segmentation methods based solely on intensity information cannot yield accurate tracking.

To overcome these difficulties, existing methods use atlas-based techniques or prior geometric properties, such as the shape of the RV learned a priori from a finite-training set. If only shapes similar to the training set are allowed, the use of active shape and appearance models can lead to a realistic solution. However, the optimization of such models does not always guarantee the global optima. The main drawbacks of statistical shape or atlas based approaches are the need for large manually segmented training sets and the results being highly dependent on the choice of the training data. The results are often biased towards a particular cardiac pathology.

Further, the shape of the RV is significantly different at end-systole in comparison to end-diastole. Therefore, in general, it is more difficult to obtain a good segmentation of the RV at end-systole than at end-diastole using the shape-based approaches. Due to its smaller size, inaccuracies in the segmentation of the RV at end-systole affect the clinical measurements such as EF significantly.

SUMMARY

The present disclosure relates to segmenting a time series of image frames in an anatomical scan. An image frame k in the time series of image frames is manually segmented. A non-rigid registration is then performed between the image frame k and a next image frame k+1 in the time series of image frames. A segmentation on the image frame k+1 is computed based on the non-rigid registration. Each subsequent image frame k+n in the time series of image frames is iteratively segmented using non-rigid registration with the segmented previous image frame k+(n−1) in the time series of image frames.

In another aspect, the present disclosure relates to a system for segmenting a time series of image frames in an anatomical scan. The system includes an image processor configured to receive a segmented image frame k from a time series of image frames and perform a non-rigid registration between the image frame k and a next image frame k+1 in the time series of image frames, and between image frame k and a previous image frame k−1 in the time series of image frames. The image processor is further configured to compute a segmentation on the image frame k+1 and k−1 based on the non-rigid registration. The image processor is further configured to segment each subsequent image frame k+n in the time series of image frames using non-rigid registration with the segmented previous image frame k+(n−1) in the time series of image frames, and to segment each previous image frame k−n in the time series of image frames using non-rigid registration with the segmented subsequent image frame k−(n+1) in the time series of image frames.

In a further aspect, the present disclosure relates to a method for segmenting a time series of image frames in an anatomical scan. A segmented image frame k from the time series of image frames is received. A non-rigid registration is performed between the image frame k and a next image frame k+1 and a previous image frame k−1 in the time series of image frames. A segmentation on the image frames k+1 and k−1 is computed based on the non-rigid registration. Each subsequent image frame k+n in the time series of image frames is segmented using non-rigid registration with the segmented previous image frame k+(n−1) in the time series of image frames, and each previous image frame k−n in the time series of image frames is segmented using non-rigid registration with the segmented previous image frame k−(n+1) in the time series of image frames.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
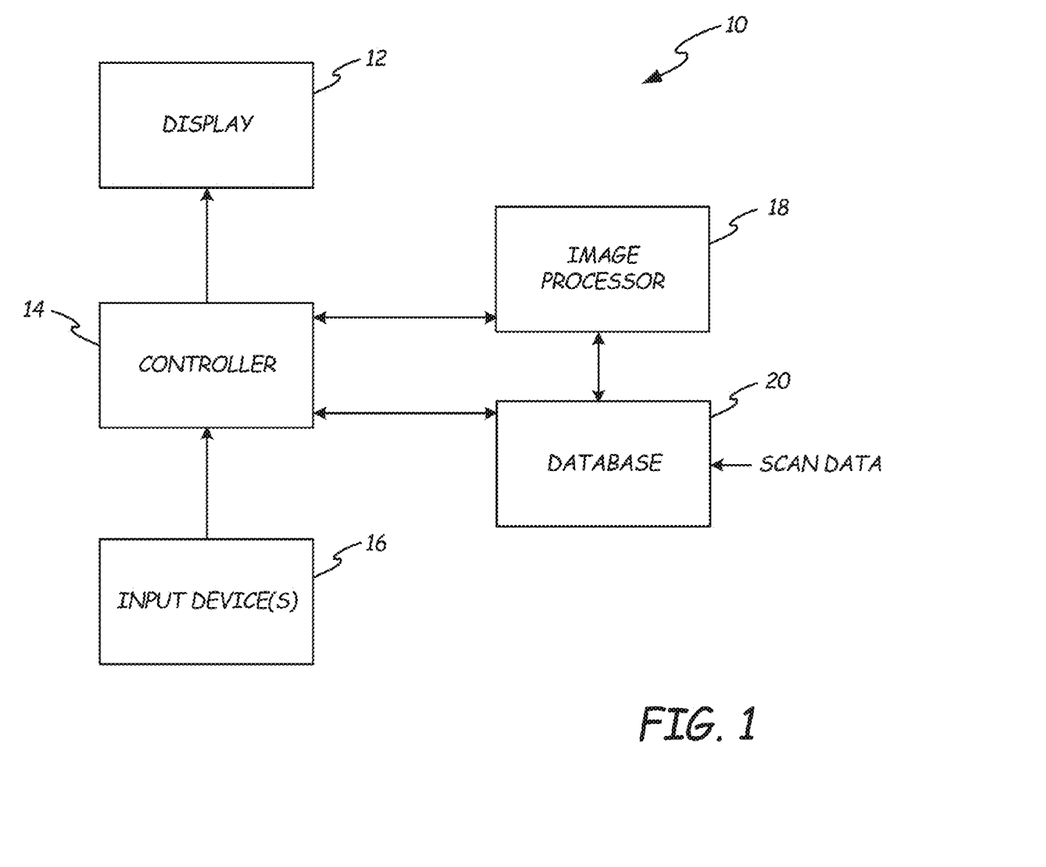
FIG. 1 is a block diagram of an embodiment of a medical imaging system configured to perform the point correspondence segmentation of the present disclosure.

FIG. 1 is a block diagram of a medical imaging system 10 including a display 12, a controller 14, one or more input devices 16, an image processor 18, and an image database 20. The controller 14 receives inputs from the one or more input devices 16 and provides an output to the display 12. The display 12, controller 14, and one or more input devices 16 may be configured as a computer workstation, and the one or more input devices 16 may include, for example, a mouse, keyboard, or digital interactive pen. The controller 14 communicates with and controls both the image processor 18 and the image database 20. In some embodiments, the image processor 18 and the image database 20 are located locally with the controller 14. In other embodiments, the controller 14 communicates with and controls the image processor 18 and the image database 20 through the internet, such as via a web-based application run on the controller 14.

The image database 20 receives and stores raw data from one or more scans (e.g., magnetic resonance (MR) scan) of a patient. The data from the one or more scans may be used by the image processor 18 to generate a moving (cine) image of the scanned anatomical feature or assemble the scans into a three dimensional (3D) image of the anatomical feature being analyzed. The image processor 18 may also isolate an anatomical feature of interest from the surrounding anatomy based on the response of each portion of the anatomy to the scan. For example, the anatomical feature of interest may have a different density (i.e., different level of transparency to the scan signal) than the surrounding anatomy, and the different portions of the anatomy can thus be separated by the image processor 18 from each other based on this varying level of density. The image processor 18 may then store data related to the assembled 3D medical image in the imaging database 20.

Figure 2:
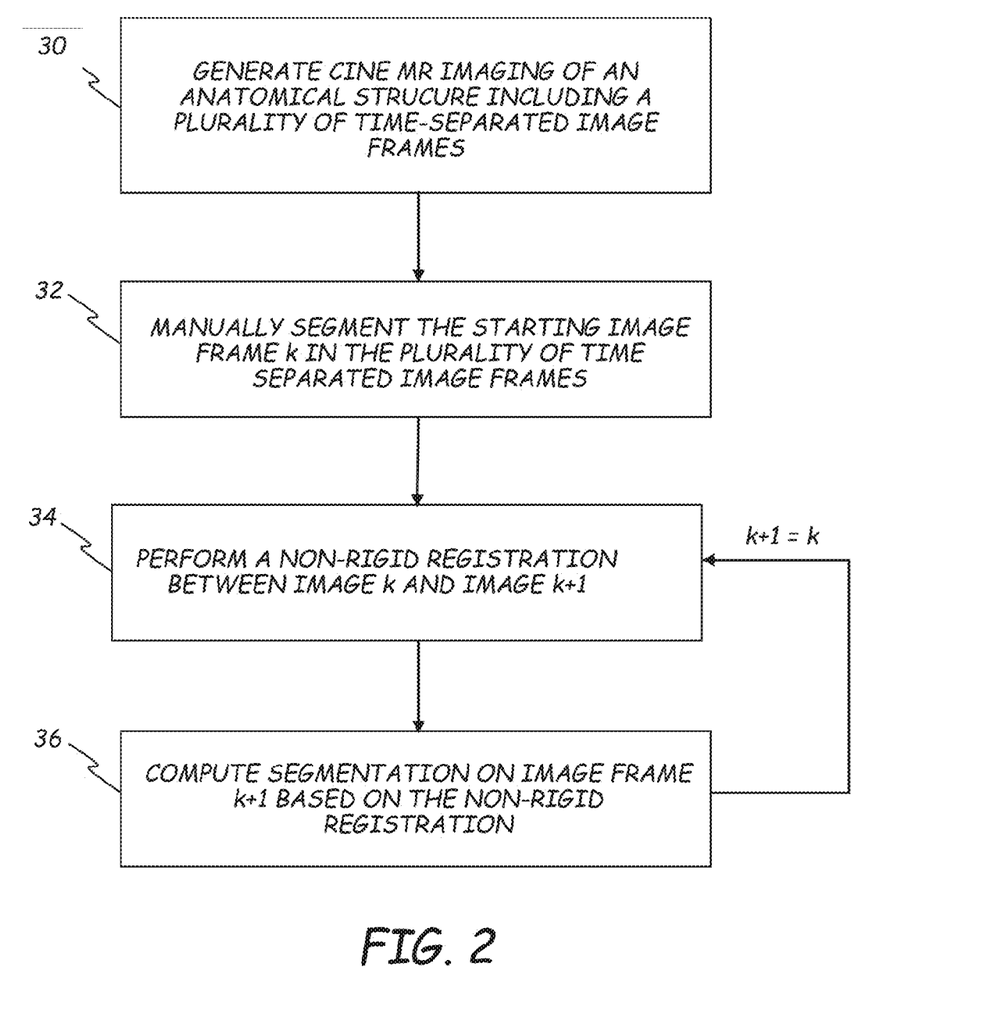
FIG. 2 is flow diagram illustrating an embodiment of a process for segmenting an anatomical structure using point correspondence.

FIG. 2 is flow diagram illustrating an embodiment of a process for segmenting an anatomical structure using point correspondence. In step 30, an anatomical cine MR image is generated. In some embodiments, the anatomical cine MR image is generated by the image processor 18 from scan data stored in the database 20. The anatomical cine MR image includes a plurality of time-separated image frames that together illustrate the dynamic activity (i.e., motion) of the anatomical structure being analyzed. In some embodiments the anatomical cine MR imaging is generated using gradient-recalled acquisition in the steady state.

When the anatomical cine MR image is generated, then, in step 32, the user manually segments an image frame (image frame k) in the cine MR image. In some embodiments, image frame k is the first image frame in the cine MR image. In one exemplary implementation, the cine MR image illustrates the right ventricle, and the user manually segments the endocardial and epicardial contours of the right ventricle in the first image frame in the cine MR image. In some embodiments, the user may control the controller 14 to retrieve the image frame to be manually segmented from the image processor 18 or database 20, view the image frame on the display 12, and segment the anatomical feature(s) using the input device(s) 16 connected to the controller 14.

After manually segmenting the image frame k, then, in step 34, the image processor 18 performs a non-rigid registration between the image frame k, and the next image frame in the cine MR image (image frame k+1). An embodiment of the algorithm employed by the image processor 18 for performing the non-rigid registration will be described in more detail below with regard to FIG. 3. In short, the image processor 18 performs a point correspondence between a point of the segmented contour in the image frame k and a point on the image frame k+1 to be segmented.

Based on the non-rigid registration between images k and k+1 by point correspondence, in step 36, the image processor 18 computes the segmentation on the image frame k+1. Then, image k+1 becomes the new image k, and steps 34 and 36 are performed again. Steps 34 and 36 are performed iteratively until each image frame in the cine MR image is segmented. In other words, each image frame k+n in the time series of image frames is iteratively segmented using non-rigid registration with the segmented previous image frame k+(n−1) in the time series of image frames. While described with regard to temporally separated image frames, the methods of the present disclosure can also be applied to segment spatially separated image frames.

It should be noted that while the method of FIG. 2 has been described for sequentially registering images in a direction of forward propagation from the manually contoured image, the method of the present disclosure can also be applied to images in a direction of backward propagation from the manually contoured image. That is, a non-rigid registration can be performed between image frame k and a previous image frame k−1 in the time series of image frames. Each previous image frame k−n in the time series of image frames can be iteratively segmented using non-rigid registration with the segmented subsequent image frame k−(n+1) in the time series of image frames. The sequential registration of images can be performed simultaneously in the forward and backward propagation directions until all image frames are segmented.

Figure 3:
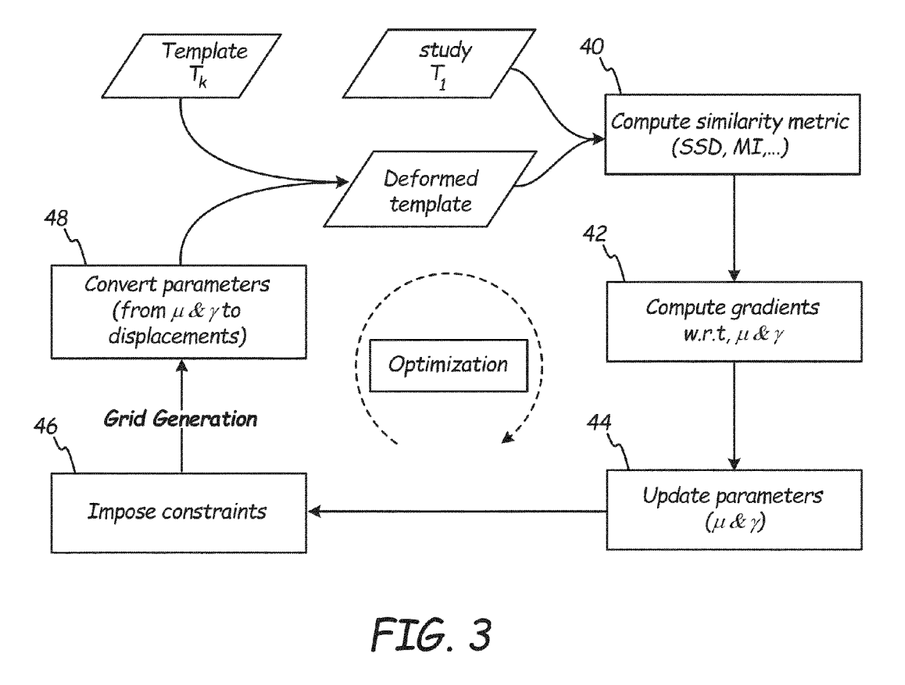
FIG. 3 is a flow diagram illustrating an embodiment of a process for obtaining point correspondence between images using a non-rigid registration algorithm.
Figure 5:
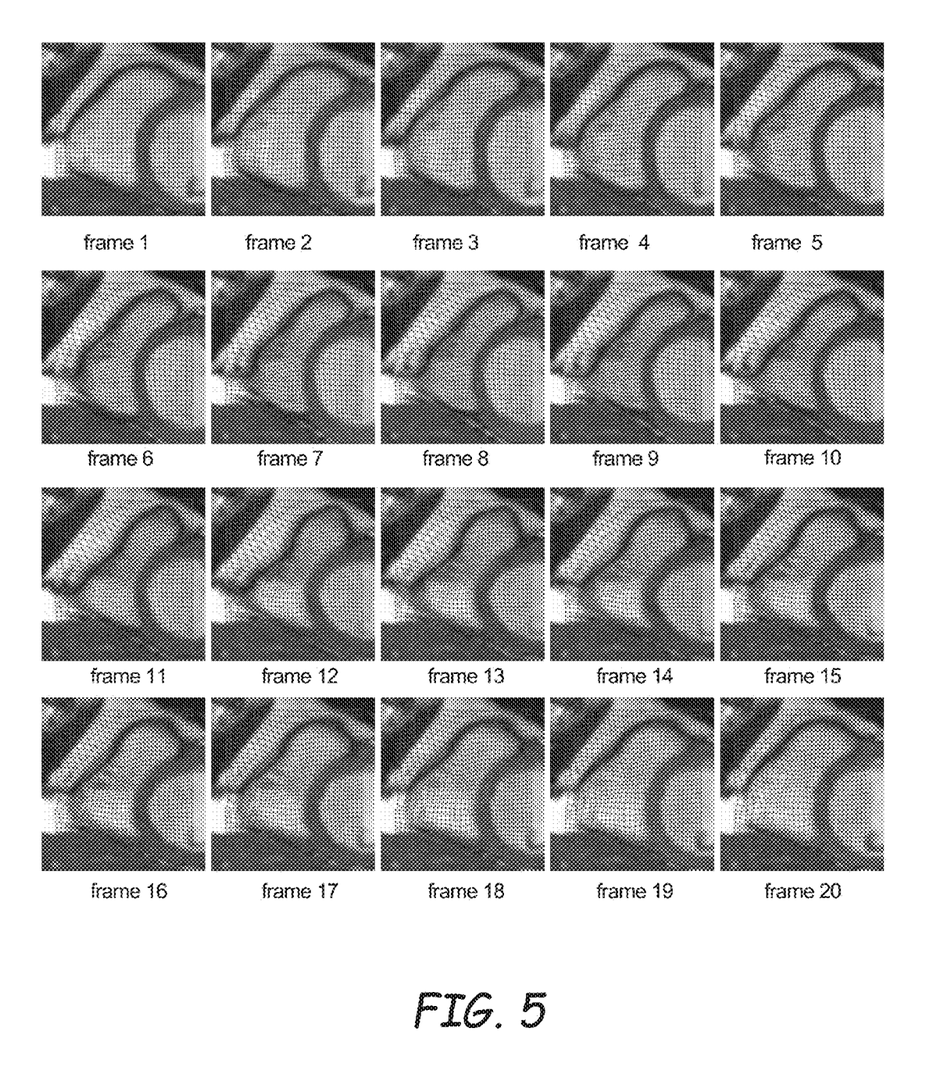
FIG. 5 is a deformation field for the right ventricle generated using the non-rigid registration algorithm.

FIG. 3 is a flow diagram illustrating an embodiment of a method for obtaining point correspondence between images using a non-rigid registration algorithm. The described method may be implemented in software executed on the image processor 18 and/or controller 14, for example. A point correspondence between the first image $T_1$ and the $k^{th}$ image $T_k$ is defined over $\Omega \subset \mathbb{R}^2$ to obtain a sequence of points over time. It can be formulated as the optimization of similarity/dissimilarity measure (step 40)

$$\hat{\varphi} = \arg \underset{\varphi}{opt} E_s(T_1, T_k, \varphi(\xi)) \qquad (1)$$

for each pixel location $\xi \in \Omega$, where $\phi : \Omega \to \Omega$ is a transformation function, and $E_s(\bullet)$ is a measure of similarity. This problem may not have a unique solution, so a deformation field (see FIG. 5) may be introduced using a Jacobian transformation $\mu$ and curl of an end velocity field $\gamma$, where $\mu : \Omega \to \mathbb{R}$ and $\gamma : \Omega \to \mathbb{R}$.

To generate a moving mesh representative of the deformation field, let $\mu(\xi)$ be a continuous monitor function constrained by $$\int_\Omega \mu = |\Omega|. \qquad (2)$$

The purpose of this step is to find a transformation $\phi : \Omega \to \Omega$, $\partial \Omega \to \partial \Omega$, so that $$J_\phi(\xi) = \mu(\xi), \qquad (3)$$

where $J_\phi$ denotes the transformation Jacobian. The following computations yield a transformation $\phi$ that verifies (3).

First, compute a vector field $\rho(\xi)$ that verifies $$\mathrm{div}\,\rho(\xi) = \mu(\xi) - 1. \qquad (4)$$

Second, build a velocity vector field from $\rho(\xi)$:

$$v_t(\xi) = \frac{\rho(\xi)}{t = (1-t)\mu(\xi)}, \quad t \in [0,1] \qquad (5)$$

where t is an artificially introduced (algorithmic) time. Third, $\phi$ is obtained by solving the following ordinary differential equation:

$$\frac{d\psi(\xi, t)}{dt} = v_t(\psi(\xi, t)), \quad t \in [0,1], \psi(\xi, t = 0) = \xi \qquad (6)$$

and setting $\phi$ equal to $\psi$ evaluated at $t=1$: $\phi(\xi) = \psi(\xi, t=1)$.

An additional constraint on the curl of $\rho(\xi)$ is added to (4), and the ensuing div-curl system is solved under the Dirichlet boundary condition to obtain a unique solution, as the above problem may have multiple solutions.

$$\begin{cases} \mathrm{div}\,\rho(\xi) = \mu(\xi) - 1 \\ \mathrm{curl}\,\rho(\xi) = \gamma(\xi) \end{cases} \qquad (7)$$

with a null boundary condition $\rho(\xi) = 0$, $\forall \xi \in \partial \Omega$, where $\gamma(\xi)$ is a continuous function over $\Omega$. Thus, the transformation can be fully parameterized by $J_\phi(\xi)$ and $\gamma(\xi)$. The Dirichlet boundary condition is used to ensure the uniqueness of the solution.

With the above parameterization, (1) can be reformulated as the following constrained optimization problem. Given two images $T_1$ and $T_k$, defined over $\Omega$, the function pair $\{\mu(\xi), \gamma(\xi)\}$ that optimizes the cost in (1) is found, subject to $$\begin{cases} \int_\Omega \mu(\xi)\, d\xi = |\Omega| \\ \tau_h > \mu(\xi) > \tau_l, \quad \xi \in \Omega' \subset \Omega \end{cases} \qquad (8)$$

where $\tau_1 > 0$ ensuring that $\phi_{\mu,\gamma}$ is a diffeomorphism, and $\Omega'$ is a sub-region of image domain $\Omega$. The constraints in (8) ensure the areas of the domain and co-domain are equal after transformation and enforces the incompressibility constraint in sub-region $\Omega'$.

The above problem can be solved by a step-then-correct optimization strategy. A sequence of corresponding points on endocardial and epicardial borders are computed in all frames of the cine MR image using the transformation function $\hat{\phi}$, given the segmentation on the first frame.

Thus, referring back to FIG. 3, in step 42, the gradients of $\mu$ and $\gamma$ are computed, which are denoted respectively by $\nabla \mu(T_1, T_k, \phi)$ and $\nabla \gamma(T_1, T_k, \phi)$.

Next, the process is terminated if the step size $\delta < \delta_{th}$ or a maximum number of iterations is reached. Otherwise, in step 44, the parameters $\mu$ and $\gamma$ are updated by (where i is the iteration number):

$$\mu^{i+1} = \mu^i + \delta \frac{\nabla \mu E_s}{\max|\nabla \mu E_s|},$$

and $$\gamma^{i+1} = \gamma^i + \delta \frac{\nabla \gamma E_s}{\max|\nabla \gamma E_s|}.$$

Then, in step 46, for each pixel location $\xi \in \Omega' \subset \Omega$, the second constraint in (8) is imposed by $$\mu^{i+1}(\xi) \leftarrow \max(\mu^{i+1}(\xi), \tau_l)$$

and $$\mu^{i+1}(\xi) \leftarrow \min(\mu^{i+1}(\xi), \tau_h)$$

For each pixel location $\xi \in \Omega$, the first constraint in (8) is imposed by $$\mu^{i+1}(\xi) \leftarrow \mu^{i+1} + (\xi) \frac{|\Omega|}{\Sigma_{\xi \in \Omega} \mu^{i+1}(\xi)}.$$

Finally, in step 48, the parameters $\mu$ and $\gamma$ are converted to displacements. To do this, a vector field $\rho(\xi)$ is found that satisfies $$\begin{cases} \mathrm{div}\,\rho(\xi) = \mu^{i+1}(\xi) - 1 \\ \mathrm{curl}\,\rho(\xi) = \gamma^{i+1}(\xi) \end{cases} \qquad (9)$$

with null boundary condition $\rho(\xi) = 0$, $\nabla \xi \in \partial \Omega$. The transformation $\phi(\xi) = \psi(\xi, t=1)$ is computed by finding the solution to the ordinary differential equation $$\frac{d\psi(\xi, t)}{dt} = v_t(\psi(\xi, t)), \quad t \in [0,1] \qquad (10)$$

with $\psi(\xi, t=0)=\xi$. The velocity vector field $v_t$ is given by $$v_t(\xi) = \frac{\rho(\xi)}{t = (1-t)\mu^{i+1}(\xi)}, \quad t \in [0, 1]. \quad (11)$$

The cost $E_s$ is then computed. If the cost improves, then $i \leftarrow i+1$, and the step-then-correct optimization algorithm returns to step 42. Otherwise, $\delta$ is decreased and the step-then-correct optimization algorithm returns to step 44.

Figure 4:
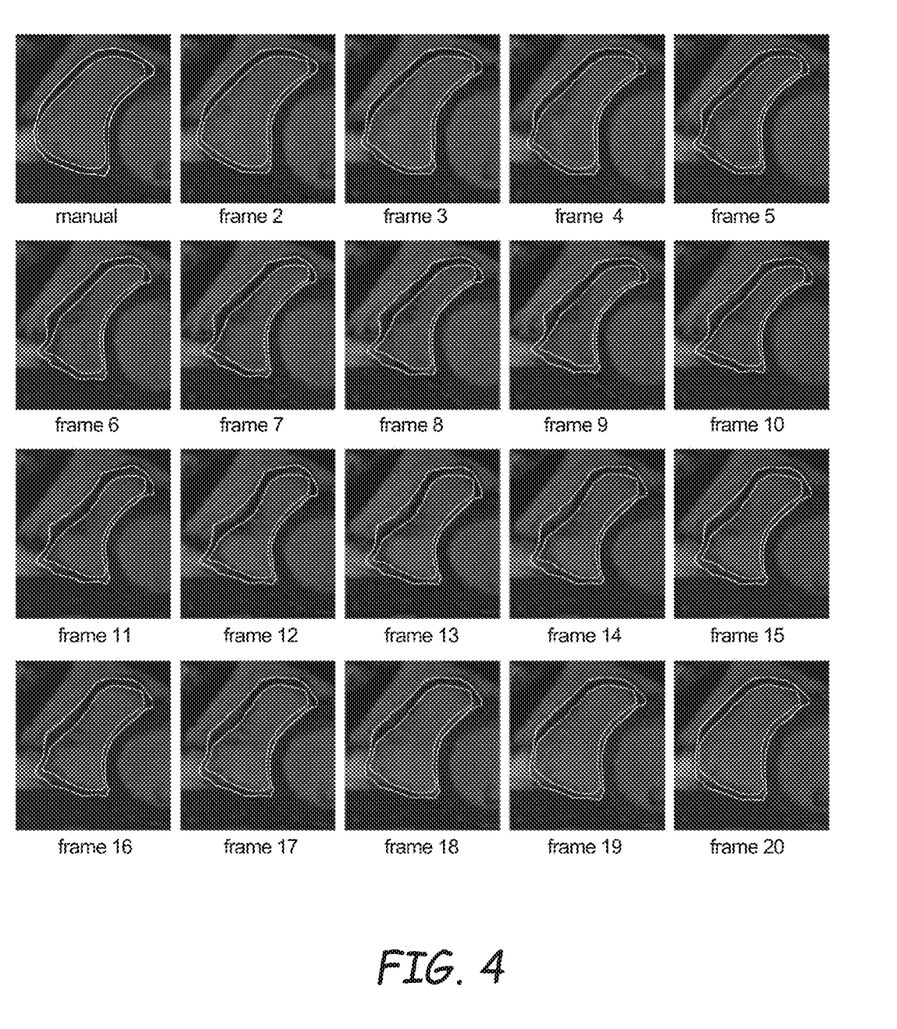
FIG. 4 is a representative example of endocardial and epicardial borders of a right ventricle over a complete cardiac cycle segmented according to the present disclosure.

To illustrate the results of the above-described method, FIG. 4 illustrates twenty image frames from a series of time-separated image frames in an anatomical cine MR generated from an MR scan. FIG. 4 illustrates a representative example of endocardial and epicardial borders of a right ventricle at different time steps over a complete cardiac cycle. Each image represents the condition of the right ventricle at different time steps, and includes the inner endocardial border (the inner line in each image) and the outer endocardial border (the outer line in each image) segmented according to the methods described above. Particularly, the first image in the image sequence can be manually segmented by a clinician, while the other images are segmented according to the method of the present disclosure. The example shown in FIG. 4 shows that the segmentation method of the present disclosure accurately included the papillary muscles inside the right ventricular cavity, even though the papillary muscles have a similar intensity profile to the myocardium of the right ventricle. FIG. 5 illustrates the right ventricle images shown in FIG. 4 overlaid with a deformation field computed using the non-rigid registration algorithm described above.

Figure 6:
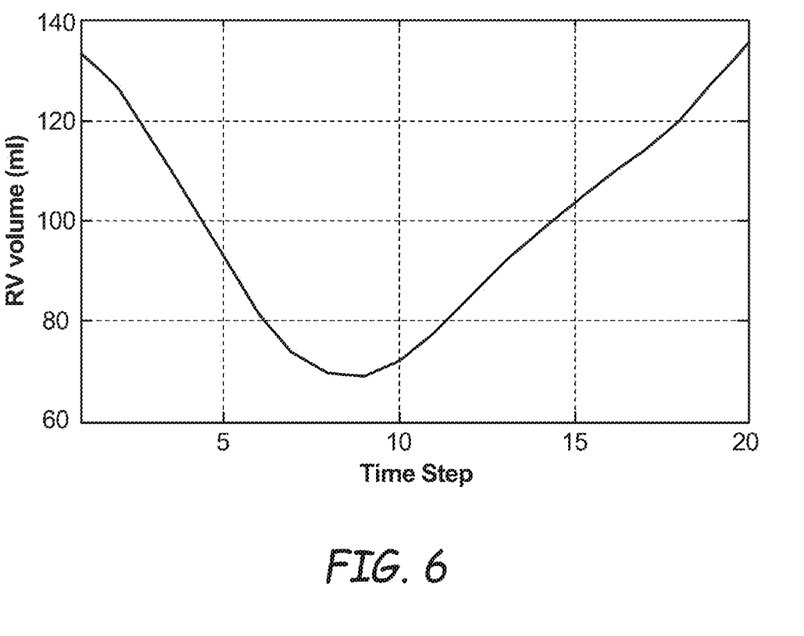
FIG. 6 is graph illustrating the volume of the right ventricular cavity versus time.

One of the features of the algorithm described herein is the ability to conduct volumetric analysis of the right ventricle over a complete cardiac cycle based on the segmented epicardial and endocardial contours of the right ventricle as established by the present method. FIG. 6 illustrates the volume of the right ventricular cavity plotted against time. In some embodiments, the image processor 18 can apply an algorithm, such as Simpson's rule, to determine the volume of the right ventricle at each time step based on the segmented right ventricle areas and spacing of the slices from the anatomical scan data.

Figure 7:
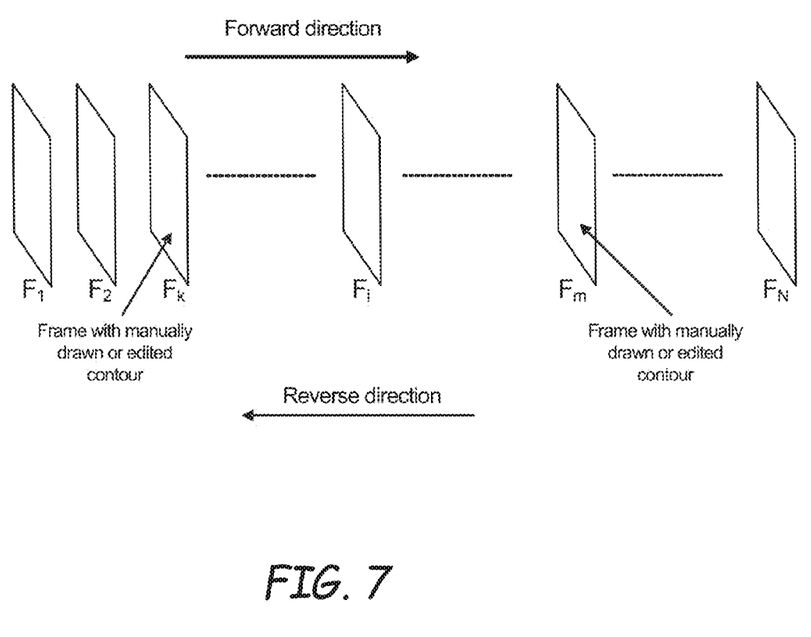
FIG. 7 illustrates a method for using point correspondence to automatically correct the contours of a series of images when the user manually edits contours on one or more images in the series of images

When a user edits contours in a segmented series of MR images, the method of the present disclosure can also be applied to automatically correct or update the rest of the contours. FIG. 7 illustrates a method for using point correspondence to automatically correct the contours of a series of images when the user manually edits contours on one or more images in the series of images. Using the method of the present disclosure, the point-correspondence is computed in forward and reverse directions from the edited image. Thus, automated contours on any arbitrary image frame $F_i$ can be computed in two different ways, given manually drawn or edited contours on $F_k$ and $F_m$ using forward and reverse direction point-correspondence. Let $C_{f,i}$ and $C_{b,i}$ be the contours computed using forward and reverse directions on $F_i$, respectively. The corrected contour $C_{c,i}$ on $F_i$ can then be computed using weighted average of $C_{f,i}$ and $C_{b,i}$. The weights are computed based on the frame distances:

$$C_{c,i} = w_{f,i} C_{f,i} + w_{b,i} C_{b,i} \quad (12)$$

where $w_{f,i}$ and $w_{b,i}$ are the weights. The weights $w_{f,i}$ and $w_{b,i}$ can be computed as $$1 - \frac{i-k}{m-k} \text{ and } 1 - \frac{m-i}{m-k},$$

respectively. The weights can also be computed differently based on the frame distance. If $F_i$ falls outside $F_k$ and $F_m$, the two separate contours for $F_i$ can still be computed since the frame sequence is cyclic, i.e., it is possible to compute forward and reverse point-correspondence between the first frame $F_1$ and last frame $F_N$. Consequently, the method of the present disclosure can also be applied if $F_i$ falls outside $F_k$ and $F_m$.

In some embodiments, the image processor 18 is configured to automatically update the segmentation of an image Fi based on a weighted avegage of an updated segmentation in immediately subsequent and previous images Fm, Fk in the time series.

In some embodiments, the image registration method of the present disclosure is performed serially by sequentially segmenting each image in the cine MR scan forward and/or backward from a manually segmented image. In other embodiments, the method of the present disclosure is performed using a parallel registration algorithm to obtain point correspondence between a sequence of images. In some embodiments, the image registration algorithm is performed in parallel using a graphics processing unit (GPU). In some embodiments, the GPU executes a Compute Unified Device Architecture (CUDA) enabled accelerated implementation of the moving mesh based image registration algorithm described above.

To parallelize the moving mesh computation described above, intra-image parallelism and/or inter-image parallelism can be applied. The intra-image parallelism is obtained by parallelizing the computational components of the moving mesh algorithm. These include computation of the transformation for each pixel in the moving mesh, the cost function using the squared $L_2$-norm and the optimizer. Also, the forward and backward propagation of the moving mesh algorithm is computed in parallel.

Figure 8A:
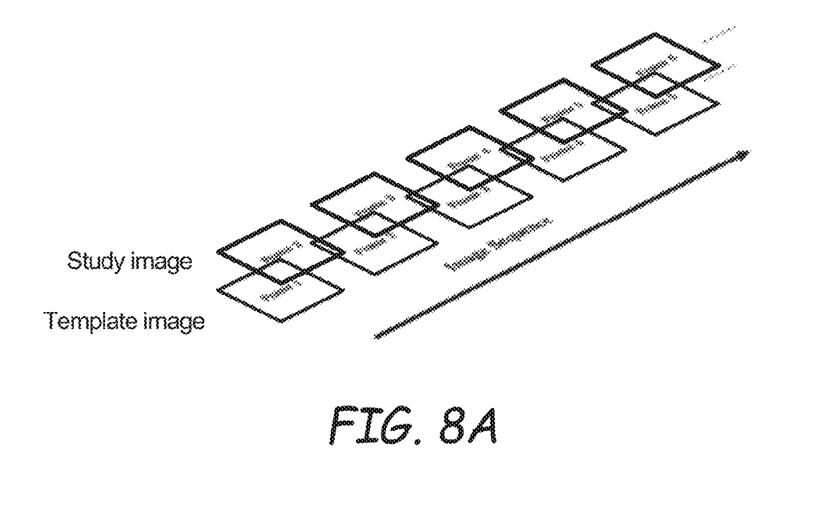
FIG. 8A illustrates a method for sequentially registering a series of images according to an embodiment of the present disclosure.

The inter-image parallelism is used to further parallelize the moving mesh correspondences between a sequence of images. The traditional way of computing image registration is to register two images at a time as depicted in FIG. 8A. This process requires running the image registration algorithm K−1 times to compute the point correspondences between a sequence of K images. As shown in FIG. 8A, when Frame 1 in the image sequence is contoured, either manually or using the image registration process of the present disclosure, Frame 1 becomes the template for the automatic registration of Frame 2 in the image sequence. Then, after Frame 2 is registered, Frame 2 becomes the template for the automatic registration of Frame 3 in the image sequence, and so on. As discussed above with regard to FIG. 7, the sequential processing of images can occur in both the forward and backward propagation directions.

Figure 8B:
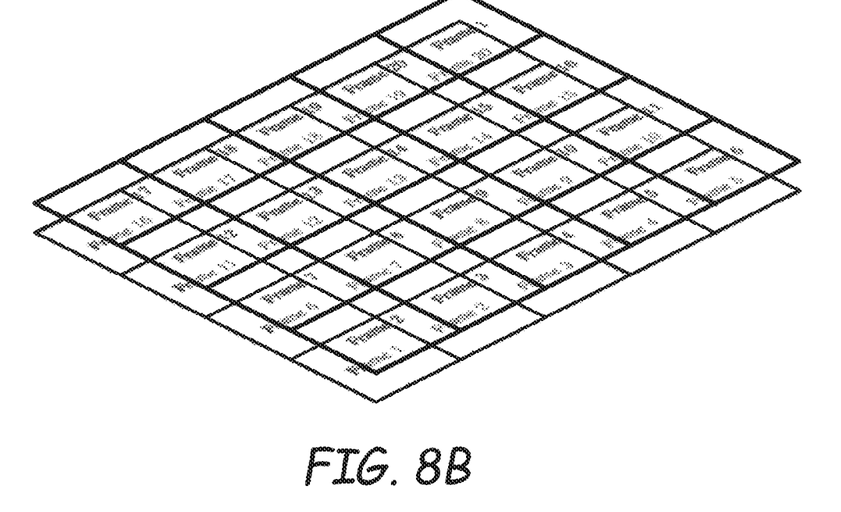
FIG. 8B illustrates a method for registering a series of images in parallel according to an embodiment of the present disclosure.
Figure 9:
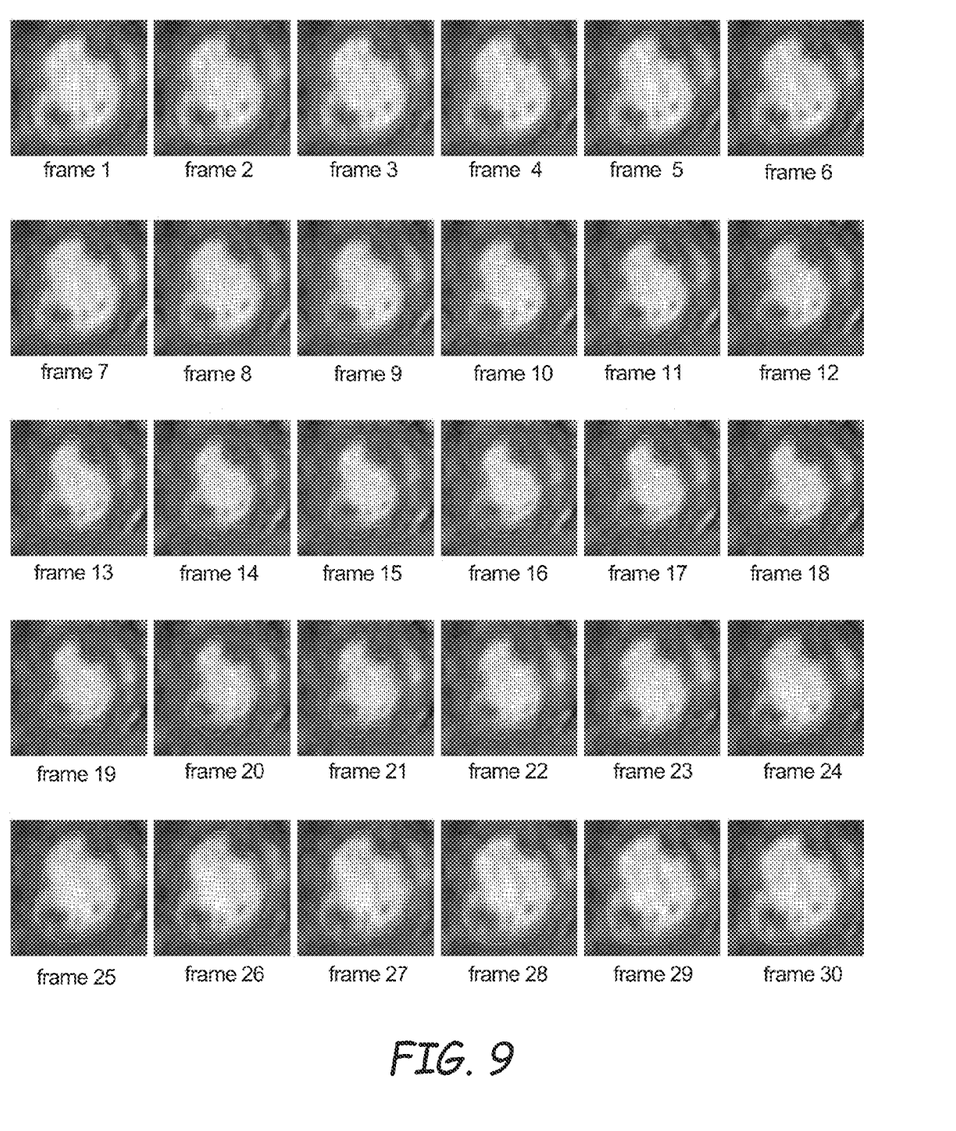
FIG. 9 is a representative example of endocardial borders and deformations of a right ventricle over a complete cardiac cycle segmented according to the present disclosure for a patient with hypoplastic left heart syndrome (HLHS).

The image registration process can be parallelized by using image concatenation to create two separate image matrices with an offset of one image as depicted in FIG. 8B. Then, the moving mesh correspondences can be computed between the concatenated images in a single step. That is, rather than the having to wait for registration of an image to complete before being able to register the next image, in the embodiment shown in FIG. 8B, the registration of each of the images in the sequence can occur in parallel. The moving mesh correspondences between the individual image pairs in the sequence can then be obtained by splitting the matrix computed from the concatenated images. An example of this parallel image registration process is provided in Example 5 below.

EXAMPLE 1

Experimental results from segmentation of MR scan data using the described methods were compared to MR scan data segmented using manual segmentation methods. Each data set was acquired on a 1.5 T MR scanner with steady-state free precession acquisition mode. Two metrics were computed to evaluate the similarities between the manual segmentations and the automatic segmentations: the Dice metric and the Hausdorff distance. In short, the segmentation method described herein yielded average Dice scores of 0.79 and 0.84 for the endocardial and epicardial segmentations, respectively. Additionally, the described segmentation method yielded average Hausdorff distances of 8.36 mm and 8.76 mm for the endocardial and epicardial segmentations, respectively.

EXAMPLE 2

As another illustration of the results of the above-described method, FIG. 8 provides a representative example of endocardial borders and deformations of a right ventricle over a complete cardiac cycle segmented according to the present disclosure for a patient with hypoplastic left heart syndrome (HLHS). In the study, the method was evaluated over 23 HLHS patients. The data sets were acquired on 1.5 T MR scanners. The average age of subjects was 166±108 days. The minimum and maximum ages of subjects were 43 and 506 days, respectively.

Experimental results from segmentation of MR scan data for the 23 HLHS patients using the described methods were compared to a MR scan data segmented using manual segmentation methods. Similar to the experimental results described above, two metrics were computed to evaluate the similarities between the manual segmentations and the automatic segmentations: the Dice metric and the Hausdorff distance. Particularly, the mean and standard deviation for each of the Dice metric and Hausdorff distance between the obtained endocardial segmentations and manual delineations at end-systole for the HLHS patient data were determined. In short, the segmentation method described herein yielded an average Dice metric of 0.8167±0.14 and an average Hausdorff distance of 5.60±2.98 mm.

The performance of the method described herein was also evaluated for estimating the end-systolic volume and ejection fraction for the HLHS patient data. Particularly, a correlation coefficient R and coefficients of linear regression fit (y=ax+b) for end-systolic volume and ejection fraction estimation were determined. For end-systolic volume, the linear regression coefficients were R=0.9583, a=1.0285, b=2.6262, and for ejection fraction, the linear regression coefficients were R=0.8280, a=0.7976, b=−0.0295. Thus, the proposed method yielded high correlation between manual and automatic clinical measurements.

EXAMPLE 3

Cardiac MR data from forty HLHS post stage-1 Norwood patients and fifteen normal controls was analyzed. End diastolic contours were manually created by an expert user in short axis and long axis cine fast imaging with steady-state precession (FISP) scans. The segmentation method of the present disclosure was then used to propagate contours through the entire cardiac cycle and to calculate peak directional strain and strain rates.

Preliminary results were obtained in a subset of 20 HLHS patients, and 10 controls. Measures of longitudinal strain (HLHS: −16.5, standard deviation (SD)=5.7; Control: −20.4, SD 7.8; p=0.0003), ratio of peak longitudinal to peak axial strain (HLHS: 0.91, SD 0.35; Control: 1.16, SD 0.37; p = 0.01), and ratio of longitudinal to axial strain rate during atrial filling (HLHS: 0.96, SD 0.52; Control: 1.12, SD 0.59; p=0.035) were significantly different between normal and HLHS patients.

EXAMPLE 4

Cardiac MR data from 39 normal children were obtained from a clinical database and analyzed. The semi-automatic segmentation method of the present disclosure was used to compute endocardial and epicardial contours for phases of the cardiac cycle based on a single manually drawn contour of end-diastole. An expert user manually edited the automated contours to determine end-systolic volume, end-diastolic volume, stroke volume, ejection fraction, global circumferential strain, vertical long axis strain, early and late filling rate and ratio, and diastolic deceleration time. The results were standardized using body surface area (BSA) to determine pediatric mean values and standard deviations.

Data from the normal pediatric CMR studies resulted in analysis of 39 left ventricles and 36 right ventricles. The subjects of the cardiac MR scans included 18 males and 21 females, average age 11.64 years, standard deviation 5.4 years, with a range of 10 days to 17 years. Weight ranged from 3.0 to 114.8 kg (mean 54.2 kg, standard deviation 29.4 kg), height 0.50 to 1.85 meters (mean 1.49 m, standard deviation 0.33 m), and body surface area 0.2 to 2.31 mL/m$^2$ (mean 1.46 m$^2$, standard deviation 0.54 m$^2$). The values obtained in the study are summarized in Table 1 below, which includes mean, standard deviation, and range values for the left and right ventricles for the following parameters: ejection fraction, end diastolic volume/body surface area (BSA), end systolic volume/BSA, stroke volume/BSA, the ratio of early diastolic ventricular filling rate (E') to the atrial phase diastolic filling rate (A'), maximum global circumferential strain, diastolic deceleration time, and maximum long axis strain. The cells marked as n/a were not calculated due to inconsistent velocity peaks during right ventricular filling.

TABLE 1

Normal values left and right ventricular functional parameters

| | Left Ventricle (mean, standard deviation, range) | Right Ventricle (mean, standard deviation, range) |
|---|---|---|
| Ejection Fraction (%) | 59.7, 4.4, 52 to 73.8 | 54.59, 5.4, 47.2 to 64.6 |
| End diastolic volume/ BSA (mL/m$^2$) | 74.6, 15.7, 38.2 to 111.6 | 74.6, 15.5, 35.3 to 99.5 |
| End systolic volume/ BSA (mL/m$^2$) | 30.1, 7.5, 14.8 to 46.8 | 35.4, 9.1, 12.3 to 57.5 |
| Stroke volume/BSA (mL/m$^2$) | 44.5, 9.5, 5.2 to 145.2 | 51.5, 8.1, 21.5 to 61.2 |
| E'/A' ratio | 3.6, 1.4, 1.1 to 6.0 | n/a** |
| Maximum global circumferential strain (%) | −30.1, −10.7, −27 to −37.7 | −28.6, −11.4, −24 to −38.3 |
| Diastolic deceleration time (msec) | 129, 45, 38 to 261 | n/a** |

TABLE 1-continued

Normal values left and right ventricular functional parameters

|  | Left Ventricle (mean, standard deviation, range) | Right Ventricle (mean, standard deviation, range) |
|---|---|---|
| Maximum long axis strain (%) | −20.8, 2.25, −17.6 to −26.16 | −16.3, −1.98, −14.2 to −18.7 |

EXAMPLE 5

The proposed parallel image registration approach described above was evaluated over an MR image data set composed of 16 subjects provided by the Right Ventricular Segmentation Challenge, MICCAI 2012. The data sets were acquired on 1.5 T MR scanners (Symphony Tim, Siemens Medical Systems, Erlangen, Germany) with steady-state free precession acquisition mode. For the moving mesh, grid sampling was set equal to the pixel spacing of the MR images.

Three versions of the algorithm were implemented: 1) a single central processing unit (CPU); 2) a graphics processing unit (GPU) with only intra-image parallelization; and 3) a GPU with inter- and intra-image parallelization. The algorithms were implemented using the Python programming language. The GPU CUDA version was implemented using Numbapro (Continuum Analytics, Austin, Tex.) with 32-bit floating-point precision. Cufft and cublas CUDA submodules were used in the GPU implementation. The single thread CPU version of the algorithm was computed on 2.4 GHz Intel Xeon processor. The GPU versions of the algorithm were computed on a NVIDIA Tesla K40c graphics card.

The CPU implementation required 3991.70±1456.78 seconds to complete a sequential image registration of the data set, the GPU implementation with only intra-image parallelization and serial inter-image registration required 14.45±0.51 seconds to complete image registration of the data set, and the GPU with both inter- and intra-image parallelization required 4.36±1.22 seconds to complete image registration of the data set. Consequently, the GPU intra- and inter-image parallelization demonstrated a significant performance improvement over the sequential image registration approaches.

The systems and methods as described herein have several advantages over existing segmentation techniques. For example, a shape template or database is not needed to obtain accurate segmentations because the point correspondence can track any curve in the image sequence. Additionally, the distributions of intensity or shape data is not assumed and the method relaxes the need of a training set. Further, in the case of cardiac segmentation, the methods of the present disclosure is flexible for congenital heart disease, where the heart chambers, particularly the right ventricle, is more variable in shape. Using registration to delineate an anatomical structure is also advantageous in that it provides the sequence of corresponding points over time, which is particularly beneficial in cardiac applications such as wall motion analysis. The methods of the present disclosure also allows for volumetric analysis, such as of a cardiac chamber over a complete cardiac cycle, as well as automatic detection of end-systolic and end-diastolic phases as it segments the feature of interest at each step in the cardiac cycle.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

We claim:

1. A system for automatically segmenting a plurality of image frames in an anatomical scan, the system comprising:
   a storage device storing the image frames, wherein the image frames comprise a series of time-separated image frames taken during the anatomical scan;
   a user interface device allowing a user to manually segment a first image frame of the image frames in order to form a manually segmented first image frame, the manually segmented first image frame including a first contour manually created by the user for delineating an anatomical structure in the first image frame;
   an image processor coupled to the storage device and configured to perform a non-rigid registration between the first image frame and a second image frame of the image frames, wherein the second image frame is adjacent the first image frame in the series and the non-rigid registration involves determining a point correspondence between pixel locations in the first image frame and pixel locations in the second image frame;
   the image processor further configured to automatically segment the second image frame based on the non-rigid registration in order to form an automatically segmented second image frame, the automatically segmented second image frame including a second contour delineating the anatomical structure in the second image frame, wherein the second contour is automatically created by the image processor transforming prior pixel locations of the first contour on the first image frame to new pixel locations for the second contour on the second image frame according to the non-rigid registration between the first image frame and the second image frame; and
   the image processor further configured to iteratively segment a plurality of subsequent image frames in the series of time-separated image frames by transforming a previously automatically generated contour for an already segmented image frame to form a newly automatically generated contour for an adjacent image frame according to a non-rigid registration performed by the image processor between the already segmented image frame and the adjacent image frame;
   whereby the first image frame is manually segmented by the user to delineate the anatomical structure, and the second image frame and the plurality of subsequent image frames in the series of time-separated image frames are thereafter automatically segmented by the image processor to delineate the anatomical structure.

2. The system of claim 1, wherein the image processor is configured to generate a moving mesh representative of a deformation field to perform non-rigid registration between image frames.

3. The system of claim 1, wherein:
   the user interface device further allows the user to manually update a segmentation in a particular one of the plurality of subsequent image frames in order to form a second manually segmented image frame; and
   the image processor is further configured to automatically update an automatic segmentation in an image frame adjacent to the particular image frame in the series by transforming a manual contour of the second manually segmented image frame to form an updated automatically generated contour for the image frame adjacent to the particular image frame according to a non-rigid registration performed by the image processor between the particular image frame and the image frame adjacent to the particular image frame;

whereby, when the user decides to change an initially performed automatic segmentation of the particular image frame by the image processor, the user can manually edit the segmentation of the particular image frame and the image processor automatically corrects the automatic segmentation in one or more image frames adjacent to the particular image frame.

4. The system of claim 3, wherein the image processor is configured to automatically correct the automatic segmentation of a center image frame based on a weighted average of updated segmentations of an immediately subsequent image frame and an immediately previous image frame in the series.

5. The system of claim 1, wherein the image processor is configured to perform non-rigid registration between a plurality of the image frames in the series in parallel.

6. The system of claim 5, wherein the image processor includes a graphics processing unit (GPU).

7. A method for automatically segmenting a plurality of image frames in an anatomical scan, the method comprising:
receiving the image frames by an image processor, wherein the image frames comprise a series of time-separated image frames taken during the anatomical scan;
allowing a user to manually segment a first image frame of the image frames utilizing a user interface device in order to form a manually segmented first image frame, the manually segmented first image frame including a first contour manually created by the user for delineating an anatomical structure in the first image frame;
performing a non-rigid registration between the first image frame and a second image frame of the image frames by the image processor, wherein the second image frame is adjacent the first image frame in the series and the non-rigid registration involves determining a point correspondence between pixel locations in the first image frame and pixel locations in the second image frame;
automatically segmenting the second image frame based on the non-rigid registration by the image processor in order to form an automatically segmented second image frame, the automatically segmented second image frame including a second contour delineating the anatomical structure in the second image frame, wherein the second contour is automatically created by the image processor transforming prior pixel locations of the first contour on the first image frame to new pixel locations for the second contour on the second image frame according to the non-rigid registration between the first image frame and the second image frame; and
iteratively segmenting a plurality of subsequent image frames in the series of time-separated image frames by the image processor transforming a previously automatically generated contour for an already segmented image frame to form a newly automatically generated contour for an adjacent image frame according to a non-rigid registration performed by the image processor between the already segmented image frame and the adjacent image frame;
whereby the first image frame is manually segmented by the user to delineate the anatomical structure, and the second image frame and the plurality of subsequent image frames in the series of time-separated image frames are thereafter automatically segmented by the image processor to delineate the anatomical structure.

8. The method of claim 7, wherein performing non-rigid registration comprises:
generating a moving mesh representative of a deformation field to perform non-rigid registration between image frames.

9. The method of claim 7, further comprising:
allowing the user to manually update a segmentation in a particular one of the plurality of subsequent image frames in order to form a second manually segmented image frame; and
automatically updating by the image processor an automatic segmentation in an image frame adjacent to the particular image frame in the series by transforming a manual contour of the second manually segmented image frame to form an updated automatically generated contour for the image frame adjacent to the particular image frame according to a non-rigid registration performed by the image processor between the particular image frame and the image frame adjacent to the particular image frame;
whereby, when the user decides to change an initially performed automatic segmentation of the particular image frame by the image processor, the user can manually edit the segmentation of the particular image frame and the image processor automatically corrects the automatic segmentation in one or more image frames adjacent to the particular image frame.

10. The method of claim 9, further comprising automatically correcting the automatic segmentation of a center image frame by the image processor based on a weighted average of updated segmentations of an immediately subsequent image frame and an immediately previous image frame in the series.

11. The method of claim 7, further comprising performing non-rigid registration between a plurality of the image frames in the series in parallel.

12. The method of claim 7, wherein the image processor includes a graphics processing unit (GPU).

13. The system of claim 1, wherein the second image frame is after the first image frame in the series of time-separated image frames.

14. The system of claim 1, wherein the second image frame is before the first image frame in the series of time-separated image frames.

15. The system of claim 4, wherein at least one subsequent image frame after the center image frame and at least one previous image frame prior to the center image frame in the series were manually segmented by the user.

16. The system of claim 1, wherein the anatomical scan is a magnetic resonance (MR) imaging of the anatomical structure being a right ventricle (RV) of a human heart.

17. The method of claim 7, wherein the second image frame is after the first image frame in the series of time-separated image frames.

18. The method of claim 7, wherein the second image frame is before the first image frame in the series of time-separated image frames.

19. The method of claim 10, wherein at least one subsequent image frame after the center image frame and at least one previous image frame prior to the center image frame in the series were manually segmented by the user.

20. The method of claim 7, wherein the anatomical scan is a magnetic resonance (MR) imaging of the anatomical structure being a right ventricle (RV) of a human heart.

* * * * *